United States Patent [19]

Rawls et al.

[11] 4,349,506
[45] Sep. 14, 1982

[54] THERMOMAGNETIC BURN CONTROL FOR MAGNETIC FUSION REACTOR

[75] Inventors: John M. Rawls, Del Mar; Unto A. Peuron, Solana Beach, both of Calif.

[73] Assignee: The United States of America as represented by the United States Department of Energy, Washington, D.C.

[21] Appl. No.: 164,989

[22] Filed: Jul. 1, 1980

[51] Int. Cl.³ .............................................. G21B 1/00
[52] U.S. Cl. ................................... 376/142; 376/143; 376/133
[58] Field of Search ............... 376/142, 146, 150, 133, 376/143

[56] References Cited

PUBLICATIONS

Kakuyugo–Kenkyu Journal 42,315(1979), Ohyabu.
Proc. 8th Symp. Eng. Pbs of Fus. Res., San Francisco (11/79), Chew et al.
"Static and Dynamic Electricity", McGraw-Hill (1968), p. 360 Smythe.
Proc. 3rd Top. Meet. CNF, Santa Fe, N.M., pp. 883–888 (1978), Turner et al., pp. 1049–1059, Kulcinski et al.
GA-A15218 (3/79), Rawls et al., Burn Control Resulting from TF Ripple.
Kakuyugo-Kenku Journal 35,224 (1976), Baker et al.

*Primary Examiner*—Sal Cangialosi
*Attorney, Agent, or Firm*—Clifton E. Clouse, Jr.; Roger S. Gaither; Richard G. Besha

[57] ABSTRACT

Apparatus is provided for controlling the plasma energy production rate of a magnetic-confinement fusion reactor, by controlling the magnetic field ripple. The apparatus includes a group of shield sectors (30a, 30b, etc.) formed of ferromagnetic material which has a temperature-dependent saturation magnetization, with each shield lying between the plasma (12) and a toroidal field coil (18). A mechanism (60) for controlling the temperature of the magnetic shields, as by controlling the flow of cooling water therethrough, thereby controls the saturation magnetization of the shields and therefore the amount of ripple in the magnetic field that confines the plasma, to thereby control the amount of heat loss from the plasma. This heat loss in turn determines the plasma state and thus the rate of energy production.

8 Claims, 3 Drawing Figures

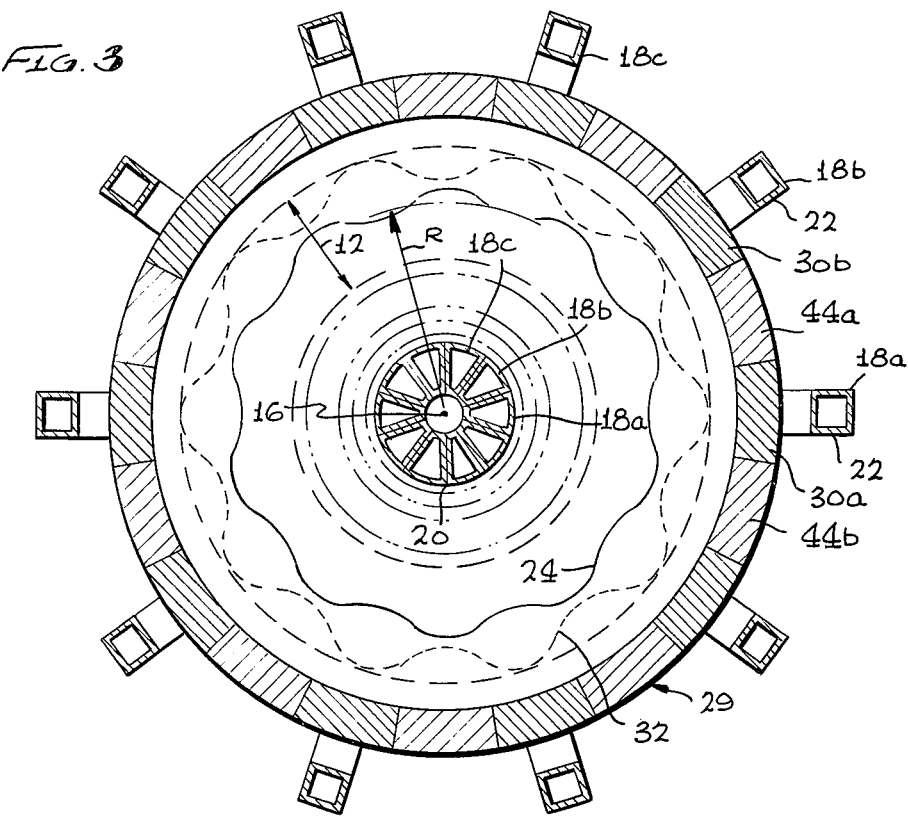
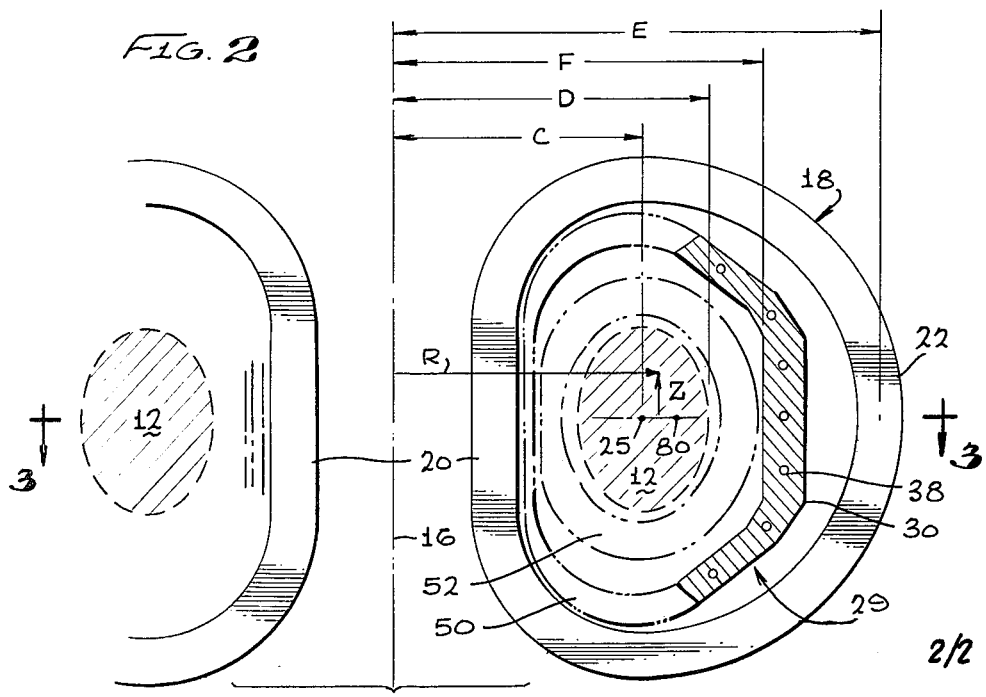

THERMOMAGNETIC BURN CONTROL FOR MAGNETIC FUSION REACTOR

BACKGROUND OF THE INVENTION

The U.S. government has rights in the invention described herein pursuant to Contract No. DE-AT-03-76ET51011 between the U.S. Department of Energy and the General Atomic Company.

A tokomak magnetic confinement fusion reactor confines a plasma within a toroidal plasma region by the use of a group of field coils that each encircle the plasma region. When the plasma, which may consist of deuterium and tritium, is "ignited," the plasma generates heat by nuclear fusion. Some of the heat escapes the plasma region and may be used to generate electricity. Successful operation of the reactor requires that sufficient heat escape to prevent such a high plasma temperature that the plasma becomes magnetohydrodynamically unstable and causes complete loss of plasma. At the same time, excessive heat should not escape from the plasma that could quench the fusion reaction. A mechanism is required to control heat loss from the plasma to maintain it at a desired operation point.

A major source of heat loss from the plasma arises from ion heat conduction due to ripple in the toroidal magnetic field that confines the plasma. Toroidal field ripple is the amount of variation of the toroidal magnetic field as measured along a circular path extending along the toroidal plasma region. The principal contribution to field ripple is the geometrical arrangement of the field coils which encircle the toroidal plasma region, and arises because of the spacing between of the outer legs of the field coils from one another. It is generally desirable to enable operation of the reactor with minimal field ripple to minimize heat losses during starting up of the reactor. A mechanism which enables controllable variations of magnetic field ripple, and which does not require large amounts of additional space within the already-filled space of typical magnetic confinement reactors, would be of considerable value.

OBJECTS AND SUMMARY OF THE INVENTION

One object of the present invention is to provide an apparatus for controlling the energy state of the plasma in a magnetic confinement fusion reactor.

Another object is to provide an apparatus for controlling magnetic field ripple in a tokamak type of fusion reactor.

Another object is to provide an apparatus for controlling the heat flow out of magnetic confinement fusion reactors.

Another object is to decrease the ripple in a magnetic containment fusion reactor during startup, and then to increase the ripple to enhance heat propagation from the plasma during normal operation.

Another object is to provide a method for controlling the energy state of a magnetic confinement fusion reactor.

In accordance with one embodiment of the present invention, an apparatus is provided for controlling the plasma energy state in a tokamak-type fusion reactor, which requires minimal additional space within the reactor. The apparatus includes a magnetic shield structure lying radially between the plasma region and the toroidal field coils of the reactor, with the shields constructed of a magnetic material which has a temperature-dependent saturation magnetization. The apparatus also includes a mechanism for controlling the temperature of the shields, to thereby vary their influence on the magnetic field ripple in the reactor and therefore the heat loss from the plasma.

The shield can include primary shield sectors lying directly between the outer leg of each toroidal field coil and the plasma, so that the magnetic ripple produced by the primary sectors counters the ripple produced by the spaced toroidal field coils. The range of values of ripple achievable can be increased by means of additional secondary magnetic shield sectors placed in the spaces between the primary shield sectors. An entire shield structure which includes the primary and secondary shields, is a largely self supporting keystoned shell. In optimal designs, the attraction between adjacent magnetic shield sectors overcomes the outward force due to radially adjacent toroidal field coils, so that a relatively modest net inward force is created which keeps the sectors under compression. Temperature control of the shields can be produced by heat transfer fluids, such as cold water for rapidly cooling the shields and steam or pressurized hot water for heating them.

The novel features of the invention are set forth with particularity in the appended claims. The invention will best be understood from the following description read in conjunction with the accompanying drawings.

BRIEF DESCRIPTION OF THE DRAWINGS

FIG. 2 is a simplified sectional view of the reactor of FIG. 1.

FIG. 3 is a simplified sectional view taken on the line 3—3 of FIG. 2.

DESCRIPTION OF THE PREFERRED EMBODIMENT

Figure 1:
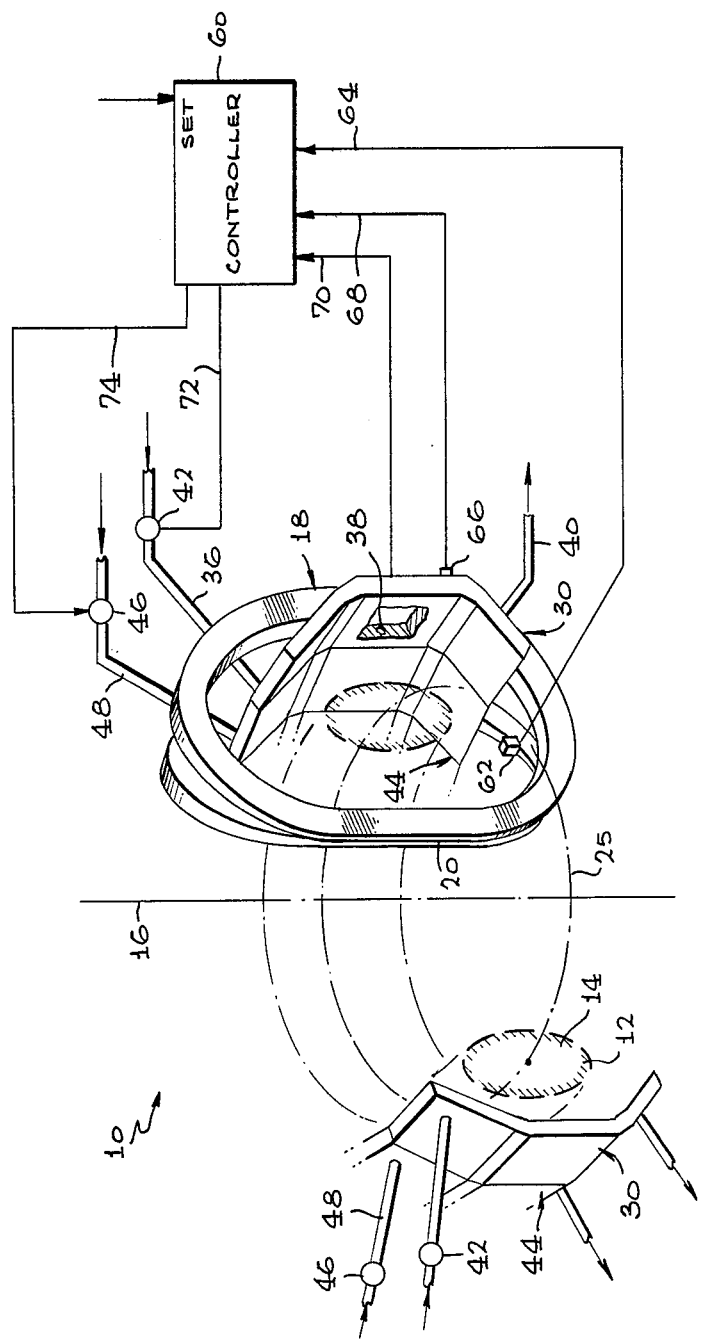
FIG. 1 is a simplified partial perspective view of a fusion reactor constructed in accordance with the present invention.

The figures show a tokamak fusion reactor 10 which includes a plasma 12 lying in a toroidal plasma region 14 which extends around a main toroidal axis 16 of the reactor. A group of toroidal field coils 18 each encircle the plasma region 14 to produce an intense toroidal magnetic field that confines the plasma to the plasma region. As indicated in FIG. 3, the reactor may have a limited number of toroidal field coils 18a, 18b, 18c, etc. such as ten of such coils. The inner leg 20 of each coil lies adjacent to the inner leg of other coils, but the other legs 22 of the coils are spaced from one another about the outside of the reactor. Each of the coils may be constructed of superconducting material and maintained at a superconducting temperature, and may carry large currents to produce a very intense magnetic field that confines the plasma within the plasma region. The plasma 12, which may consist of deuterium and tritium, is assumed to be at a sufficiently high temperature and density to produce a self-sustaining fusion reaction, so that heat can be withdrawn from the plasma for generating electric power or other purposes.

The strength of the magnetic field produced by the toroidal field coils 18 deviates from axisymmetry, or in other words, varies in strength at positions angularly spaced about the main axis 16 of the toroid. The magnetic flux line 24 shown in FIG. 3 with exaggerated waviness, represents the flux due solely to the toroidal field coils 18. It can be seen that the field coil flux lines 24 tend to bulge inwardly between the angular positions of the field coils 18. Toroidal field ripple is a measure of the amount of variation of the magnetic field along a path which is at a constant distance R from the main toroidal axis 16 and which is at a constant height Z (FIG. 2) relative to the midplane of the torus on which the toroid centerline 24 lies. Specifically, the ripple, as a function of R and Z is given by $$\Delta (R,Z) = \frac{B_{max} - B_{min}}{B_{max} + B_{min}}$$

where $\Delta$ is the field ripple at a particular distance R from the main axis of the toroid and a particular distance Z from the midplane of the toroid, and $B_{max}$ and $B_{min}$ are the maximum and minimum values of the toroidal field along this path.

The toroidal magnetic field ripple can be reduced by the use of a shield structure 29 which includes primary magnetic shield sectors 30 that lie between the plasma region 14 and the toroidal field coils 18. (as well as other shield sectors 44, which will be discussed hereinafter). The magnetic shield sectors such as 30a, 30b lie inside the outer legs of the corresponding toroidal field coils such as 18a, 18b. The effect of the magnetic shield sectors 30, which are formed of ferromagnetic material, is to add a nonuniformity of the character shown by the flux lines 32 in FIG. 3, wherein there is an outward bulge at each coil 18. By employing primary shield sectors 30 of proper strength and shape, their effect can be to largely counter the ripple produced by the main field coils 18. While quiescent primary shields or shield sectors, such as 30a, 30b, etc. can minimize the ripple in a reactor, which is useful particularly during start-up when minimal heat losses from the plasma are desired, the simple quiescent shields are not especially useful in increasing ripple in a controlled manner so as to increase energy losses from the plasma to maintain the plasma at a desired operating level.

In accordance with the present invention, the magnetic shield sectors 30 are utilized not only to minimize ripple in the magnetic field when this is desired, but are utilized to control the amount of magnetic field ripple and therefore of heat losses from the plasma. This is accomplished essentially by constructing the shield sectors 30 of a material having a significant temperature-dependent saturation magnetization, and by utilizing a mechanism to control the temperature of the shields.

The saturation magnetization of a ferromagnetic material (material which permits a large magnetic flux density for a specific magnetizing force) is the maximum flux density or magnetic induction produced in the material when the magnetizing force increases virtually without limit. A typical ferromagnetic material such as iron has an intrinsic saturation of about 1.5 tesla (14 kilogauss). However, the saturation magnetization normally decreases as the temperature of the material increases, and at the Curie temperature the ferromagnetic material reverts to a paramagnetic state and thereby produces only a small magnetic flux for a given magnetizing force. The high magnetic flux density necessary to confine the plasma will saturate any magnetic material, so the saturation magnetization level of the magnetic shield sectors determines their effect on the field ripple. Thus, by controlling the temperature of the magnetic shield sectors 30 of FIG. 3, the amount of ripple reduction that they produce can be controlled, to thereby control the net field ripple and therefore the heat losses from the plasma. If the shield sectors 30 are heated to more than their Curie temperature, they have no effect in reducing ripple, and the ripple is of the original magnitude as shown at 24.

The temperature of the shield sectors can be rapidly adjusted in a hydraulic manner, by utilizing fluids to heat and/or cool the shields rapidly, and by utilizing valves or the like to control the flow of such fluids. FIG. 1 shows a conduit 36 for carrying a heat transfer medium such as water to the shield 30, so that the fluid can pass through passages 38 in the shield sector and flow out through another conduit 40. The temperature of the shield sector can be rapidly adjusted by operating a valve 42 to control the amount of fluid passing through the shield. The shield sector can be rapidly cooled by passing cold water through the conduits, and can be rapidly heated by passing superheated steam or pressurized hot water through the conduits.

The primary shield sectors 30 are useful in reducing magnetic field ripple from a moderate amount to perhaps 1/10th as much. When the primary shield sectors are heated to beyond the Curie temperature, the original ripple and corresponding heat losses occur. However, such ripple and heat loss may not be sufficient in the control of the reactor. Enhanced field ripple and therefore cooling of the plasma can be produced by utilizing a group of secondary shield sectors 44 which are located inbetween the angular positions of the main field coils 18. The secondary shields 44a, 44b, etc. are constructed of ferromagnetic material, and their location causes a ripple or bulging of the magnetic field at the same locations as for the toroidal field shown at 24. However, if low ripple is desired the additional bulging caused by the secondary shield sectors 44 can be counteracted by utilizing larger primary shield sectors 30, or by disabling the secondary shield sectors 44, for example, by heating them. As in the case of the main shield sectors 30, the temperature of the secondary shield sectors 44 are closely maintained, as by the use of heat transfer fluids to cool and/or heat them. As shown in FIG. 1, valves 46 can be placed along conduits 48 leading to the secondary shield sectors to control the flow of such heat transfer fluids to thereby control the temperature and therefore the magnetization saturation of the secondary shield sectors.

In operation of the reactor with primary shield sectors 30 lying inside the toroidal field coils 18 and secondary shield sectors 44 lying in the space between the field coils, the primary shield sectors 30 may be maintained at a relatively low temperature during start up of the reactor to minimize field ripple. At the same time, the secondary shield sectors 44 may be maintained at an elevated temperature, which may exceed the Curie temperature of the material of the secondary shields, to avoid an increase the field ripple. As the desired energy level of the plasma is approached, the temperature of the set of primary shield sectors 30 may be raised and/or the temperature of the set of secondary shield sectors 44 decreased, to increase field ripple and therefore increase heat losses from the plasma to prevent further temperature rise of the plasma. If the plasma temperature begins to rapidly rise or fall, heat losses from the plasma may be rapidly increased or decreased by rapidly increasing the temperature of one set of shield sectors while decreasing the temperature of the other set of shield sectors. The provision of secondary shield sectors 44 enables the production of much greater field ripple than could be achieved by only varying the temperature of the primary shield sector 30, to thereby permit greater control of plasma temperature.

The secondary shield sectors 44 are useful not only to enhance control of field ripple and therefore plasma energy state, but also to facilitate support of the primary shield sectors 30. The primary shield sectors 30 are subjected to large magnetic forces tending to draw them radially inwardly in an optimized design where the outward force is overcompensated. By the use of a substantially continuous ring of alternating primary and secondary magnetic shield sectors, which are preferably fastened together, the shields support one another against radially inward movement. This is useful in minimizing the amount of additional structural supports within the reactor, where the space is already very crowded.

The shield 29 as a whole, which consists of the primary and secondary shield sectors, not only helps control the energy state of the plasma, but is also useful as a radiation shield that prevents the escape of high energy neutrons along the outer portion of the plasma and also serves to minimize heating of the toroidal field coils 18. As shown in FIG. 2, the magnetic portions of the shield such as primary shield sector 30, extend about halfway around the plasma. The complete radiation shield 50 of which the magnetic shield sectors are a part, will normally be required to extend along at least the top and bottom of the reactor to also minimize the escape of neutrons that are dangerous to people. Since it is envisioned that the magnetic shield sectors will be composed of materials that are suitable for the radiation shielding function, the ripple reduction function of magnetic shield sectors 30, 44 can be achieved without occupying additional space. It also may be noted that a heat transfer blanket 52 may be utilized immediately around the plasma region 14 to transfer most of the high-energy heat produced by the plasma which can be utilized for generating electricity and other purposes. By utilizing magnetic field ripple control to control the loss of heat from the plasma 12, the shield sectors 30, 44 avoid the need for additional penetrations of the heat transfer blanket 42 to maintain such control.

FIG. 1 shows a simplified control system for controlling the amount of magnetic field ripple in the plasma 12 by controlling the temperatures of the primary and secondary shield sectors 30, 44. A controller 60 monitors the energy state or temperature of the plasma 12 by the use of a sensor 62. The sensor 62 can be a device such as a proton-recoil neutron detector which measures neutron flux from the plasma to indicate the energy state thereof, and delivers its output to an input 64 of the controller. The temperatures of the shield sectors 30 and 44 are monitored by thermocouples such as 66 which deliver signals to inputs 68 and 70 of the controller to indicate the temperatures of the shields. When the temperature of the plasma increases beyond a desired operating point, the controller can deliver signals over outputs 72 and 74 to the valves 42, 46 that control the flow of heat transfer fluids to the shields. For example, if it is assumed that the plasma creates sufficient heat to heat the primary and secondary shields above their Curie temperatures, and if minimal additional heat losses from the plasma are desired, then coolant may flow through only valve 42 to cool the primary shield sectors 30, while the valves 46 may be kept closed to avoid cooling the secondary shield sectors. If the temperature of the plasma begins to increase to above the desired level, then the valve 46 may be quickly opened to permit cooling water to flow therethrough and cool the secondary shield sectors 44 so as to increase ripple and therefore heat loss from the plamsa. At the same time, the valves 42 may be closed to permit the primary shield sectors to increase in temperature. More rapid response can be provided by connecting a source of superheated steam or pressurized hot water to flow through the valves 42, to more rapidly heat the primary shield sectors than they would be heated merely by heat generated by the plasma. Cooling of the plasma can be accomplished in a corresponding manner by opening the valves 42 to the flow through of cooling water to rapidly cool the primary shield sectors, while flowing steam or pressurized hot water through the valves 46 to rapidly heat the secondary shield sectors. Such control is useful in terminating plasma burn without sudden loss of plasma.

One design of a reactor in accordance with the invention utilizes Carpenter "32" magnetic material for the primary and secondary shield sectors 30, 44. This material has a Curie temperature of 200° C. and a room temperature value of saturation magnetization of 1.06 Tesla. The shield sectors may be formed of laminations, to minimize eddy current losses from rapidly changing magnetic field, although the high magnetic flux density necessary to confine the plasma will normally saturate the magnetic material.

The reactor design utilized a ten coil tokamak with a plasma center located a distance C (FIG. 2) of 5.2 meters from the main axis 16 of the tokamak. The plasma outer edge was located a distance D of 6.5 meters from the axis 16, while the center of the return leg of the field coil was located at a distance E of 10.1 meters from the axis. Both the return leg 22 of the coil and the middle of the magnetic shield sector 30 had a thickness of one meter. The inside of each shield sector 30 was located a distance F of 7.6 meters from the toroidal axis. The following table shows the variation in magnetic field ripple at a location 80 which is 5.85 meters from the axis 16, or in other words, halfway between the center and outer edge of the plasma.

TABLE I

| Temperature of Primary Shields °C. | Saturation Magnetization Of Shield Material Tesla | Ripple % |
|---|---|---|
| 0 | 1.1 | 0.22 |
| 20 | 1.06 | 0.24 |
| 60 | 0.94 | 0.32 |
| 100 | 0.74 | 0.42 |
| 150 | 0.44 | 0.52 |
| 200 | 0 | 0.71 |

The table shows that a temperature excursion of the primary shields from room temperature (20° C.) to the Curie temperature (200° C.) increases the ripple by a factor of about 3.

Thus, the invention provides an apparatus for use with a magnetic confinement fusion reactor, and especially of the tokamak design, which facilitates control of the energy state of the plasma. This is accomplished by utilizing a shield structure formed of magnetic material for controlling the amount of ripple of the magnetic field in the plasma, and by controlling the magnetic effect of the shield. A shield structure formed of ferromagnetic material which has a considerable temperature dependence of the saturation magnetization can be utilized together with a means for controlling the temperature of the shield. Primary shield sectors can be utilized which are located between the plasma and the outer legs of the main field coils, to reduce magnetic field ripple produced by the spacing of the outer legs of the field coils from one another. Fluid-flow cooling and/or heating of the magnetic material can be employed, to enable rapid change in field ripple in a relatively simple manner. In addition to the primary shield sectors, secondary shield sectors can be utilized between adjacent primary shield sectors, with the secondary shield sectors controlled in temperature to enable even more extensive controllable variation in magnetic field ripple. The primary and magnetic shield sectors are preferably fastened to one another to form a ring that enables the shield sectors to support one another against movement by the large magnetic forces produced by the field coils. The magnetic shield can serve not only for ripple control, but can also serve as a portion of the necessary radiation shield of the reactor. The shield enables plasma control in a relatively simple manner without taking up large additional amounts of space within the reactor. The ripple control is useful not only in a fully operating reactor, but also in presetting the operating point of a research magnetic fusion device, even one without reacting fuel.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a fusion reactor which includes a plurality of spaced field coils that each extend around a plasma region, to generate a magnetic field at the plasma region, the improvement of means for controlling magnetic field ripple comprising:
    a magnetic shield structure formed of ferrormagnetic material which has a temperature-dependent saturation magnetization, said structure lying between the plasma region and field coils;
    means for controlling the temperature of said shield structure, to thereby cause the magnetic field ripple and therefore the heat loss from said plasma; and
    means responsive to the state of said plasma for operating said temperature controlling means.

2. The improvement described in claim 1 wherein:
    said temperature controlling means includes a conduit for carrying a cooling fluid to and from said shield structure and means for controlling the flow of fluid through said conduit, and wherein said means responsive to the state of said plasma for operating said temperature controlling means functions to increase the flow of cooling fluid when the plasma energy level increases above a predetermined energy state, thereby permitting increased magnetic field ripple and therefore increased heat losses from the plasma to decrease the plasma activity.

3. In a fusion reactor which includes a plurality of spaced field coils that each extend around a plasma region, to generate a magnetic field at the plasma region, the improvement of means for controlling magnetic field ripple comprising:
    a magnetic shield structure which includes a plurality of primary shield sectors which are each located between the plasma region and a field coil, and a plurality of secondary shield sectors lying between pairs of said primary shield sectors each of said primary and secondary shield sectors constructed of ferromagnetic material having a temperature-dependent saturation magnetization; and
    means for changing the temperature of said primary and secondary shield sectors independently of each other.

4. The improvement described in claim 3 wherein:
    said plasma region extends in a toroid, and said primary and secondary shield sectors extend along the outside of said toroid and mechanically support one another to resist the large magnetic forces produced by the field coils.

5. A fusion reactor comprising:
    a plurality of field coils encircling a toroidal plasma region;
    a magnetic shield structure constructed of magnetic material having a temperature-dependent saturation magnetization, and located outside said plasma region but inside the region encircled by the field coils;
    means for sensing the energy state of a plasma lying in said plasma region; and
    means responsive to said sensing means for controlling the temperature of said magnetic material.

6. A method for operating a fusion reactor of the tokamak type to control the energy state of the plasma therein, comprising:
    monitoring the energy state of the plasma; and
    controlling in response to the energy state of the plasma the temperatures of magnetic shield sectors that lie at a radial position which is outside the plasma region but inside the field coils, and that are constructed of magnetic material having a temperature-dependent saturation magnetization, to vary the degree of magnetic field ripple in the region which contains the plasma.

7. The method described in claim 6 wherein said step of controlling includes increasing and decreasing the flow of coolant to said shield sectors when the energy state of said plasma lies respectively below and above a predetermined energy state.

8. The method described in claim 6 wherein:
    said magnetic shields include a set of primary shield sectors lying directly inside said field coils and a set of secondary shield sectors lying between said primary shield sectors; and
    said step of controlling includes changing the temperatures of both said primary and secondary shield sectors in directions to increase the saturation magnetization of one set of shield sectors and decrease the saturation magnetization of the other set of shield sectors.

* * * * *